United States Patent [19]

Kaarlela

[11] 4,155,665
[45] May 22, 1979

[54] RESILIENT RETENTION KEY FOR REPLACEABLE RIPPER TEETH

[75] Inventor: Willard O. Kaarlela, Chillicothe, Ill.

[73] Assignee: Caterpillar Tractor Co., Peoria, Ill.

[21] Appl. No.: 816,830

[22] Filed: Jul. 18, 1977

Related U.S. Application Data

[63] Continuation-in-part of Ser. No. 671,639, Mar. 29, 1976, abandoned.

[51] Int. Cl.² .......................... B25G 3/28; F16B 3/00
[52] U.S. Cl. .................................. 403/355; 403/361; 172/772; 37/142 A
[58] Field of Search ............... 403/355, 361, 378, 379, 403/408; 37/142 A; 175/413; 85/8.3; 172/699, 700, 719, 753, 769, 772

[56] References Cited

U.S. PATENT DOCUMENTS

| 2,483,032 | 9/1949 | Baer | 403/355 X |
| 3,526,435 | 9/1970 | Krekeler | 37/142 A X |
| 3,894,349 | 7/1975 | Moreau | 37/142 A |

FOREIGN PATENT DOCUMENTS 2353848  5/1974  Fed. Rep. of Germany ........ 37/142 A

*Primary Examiner*—Wayne L. Shedd
*Attorney, Agent, or Firm*—Phillips, Moore, Weissenberger, Lempio & Majestic

[57] ABSTRACT

A ripper tip is detachably mounted on a wedge-shaped nose of a shank by an elongated retention apparatus. The retention apparatus comprises a resilient, expandible retainer defining a cavity therein, a lock pin partially disposed within the cavity and an elastomeric slug disposed in the cavity between the retainer and lock pin urging the retainer into bearing contact with the shank and the lock pin into bearing contact with the tip. The retainer is of U-shape section having bottom and side walls which are expanded by the slug to fill an opening formed by a wall through the shank, and also includes flanges at the upper ends of the side walls which do not expand within the opening, yet contact such shank wall.

11 Claims, 6 Drawing Figures

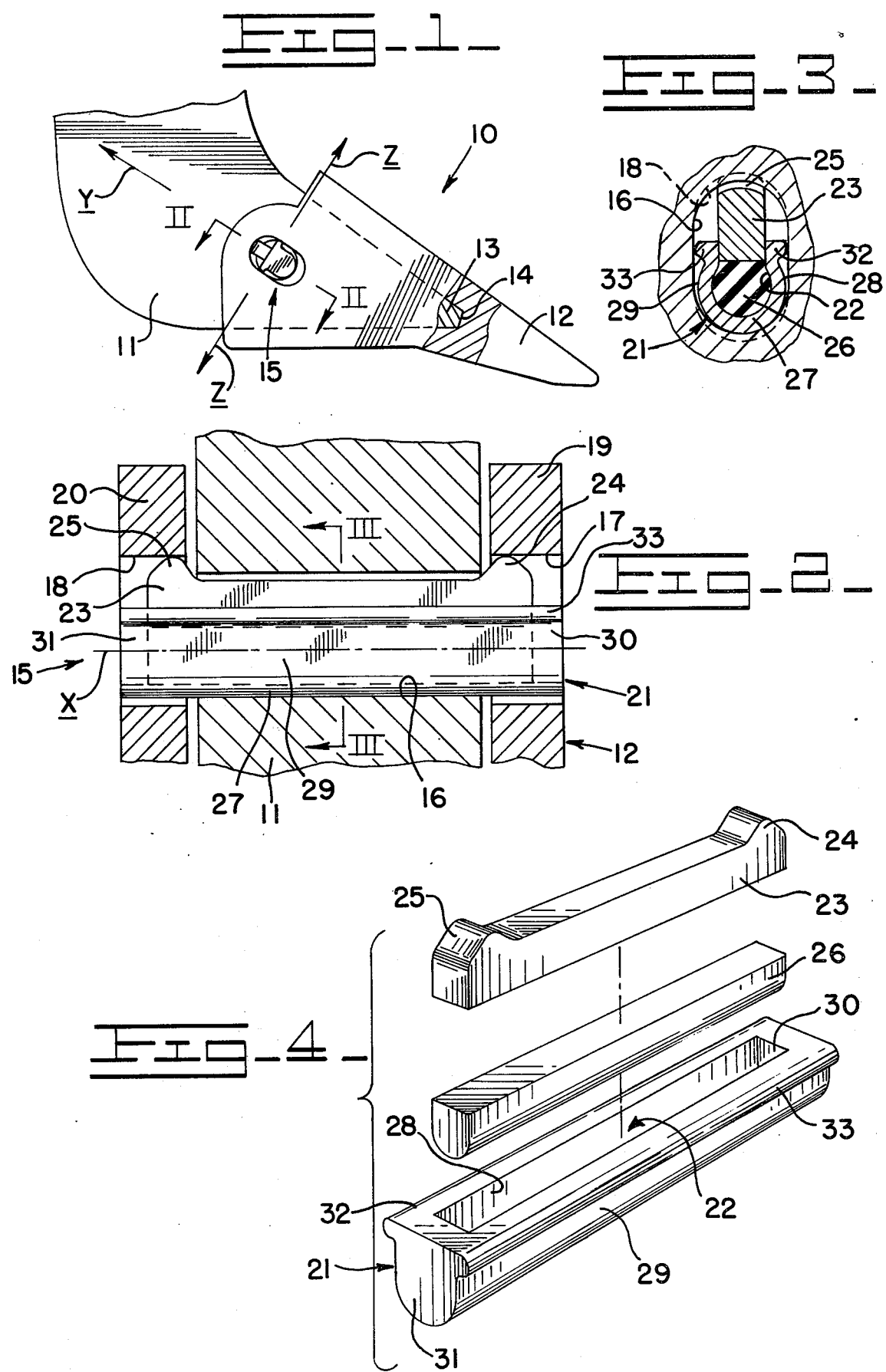

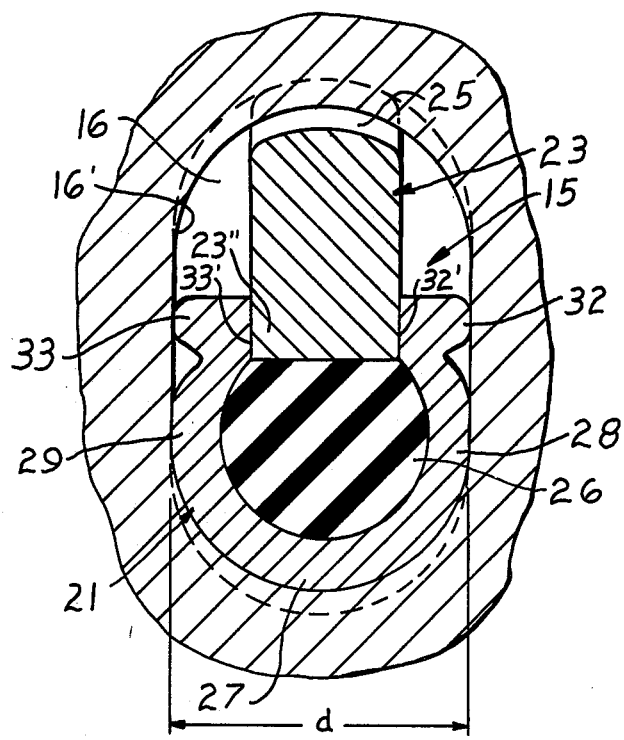
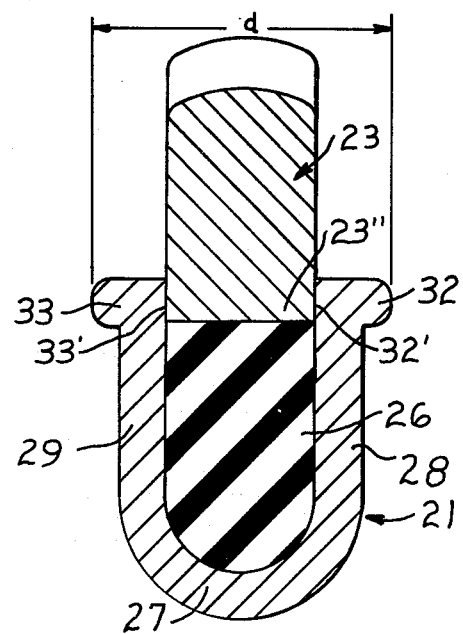

RESILIENT RETENTION KEY FOR REPLACEABLE RIPPER TEETH

CROSS-REFERENCES TO RELATED APPLICATIONS

This application is a continuation-in-part of application Ser. No. 671,639, filed Mar. 29, 1976, now abandoned.

BACKGROUND OF THE INVENTION

Conventional work tools such as impact rock breakers and rippers comprise a shank having a tip mounted on the nose thereof by a pin or other suitable retaining or retention means extending through openings in the shank and tip. Unless the nose of the shank is held in continuous bearing contact with the tip, the pin, the shank and/or tip may be subjected to damage. Consequently, the retention means should fit tightly between the shank and tip to firmly secure these latter two members together. It is further desirable that the retention means be adapted to expeditiously mount the tip on the shank and be capable of expeditiously demounting the same for servicing purposes. A problem with prior retention means is to design them for easy entry into and removal from the shank and tip openings, yet enable them to bear firmly in contact with the shank and tip once they are lodged in such openings for secure mounting purposes.

SUMMARY OF THE INVENTION

An object of this invention is to provide an improved retaining means for securing a support member, for example, the shank, to another member, for example, the tip.

Another object of this invention is to provide an improved retaining means for expeditiously mounting a tip on a support member of a work tool and for expeditiously demounting the same.

The support member comprises a wedge-shaped nose having the tip mounted in bearing contact thereon and with laterally spaced side walls or plates of the tip straddling the support member. The retention means is disposed in aligned openings formed through the support member and side walls of the tip and comprises a resilient expandable retainer defining a cavity therein, a lock pin partially disposed within the cavity and further disposed in straddling relationship relative to the support member, and an elastomeric slug disposed in the cavity between the retainer and lock pin.

The slug functions to urge the retainer into bearing contact with the support member and to further urge the lock pin into bearing contact with the tip. Thus, the retention means may be preloaded in the work tool to exert a minimum force, such as 12,000, lbs., between the support member and tip to continuously maintain the bearing contact therebetween. In the preferred embodiment of this invention, the retainer is of U-shape section having a bottom wall and two side walls which expand into bearing contact with the support member within its opening upon assembly of the work tool, the expansion occurring due to pressure being exerted by the lock pin through the slug on the side walls. The retainer also includes flanges on the upper ends of its side walls which contact the support member without expanding.

BRIEF DESCRIPTION OF THE DRAWINGS

Further objects of this invention will become apparent from the following description and accompanying drawings wherein:

FIG. 1 is a partially sectioned side elevational view of a rock breaker or ripper comprising a shank having a tip detachably mounted thereon by retention means embodying this invention.

FIG. 2 is an enlarged longitudinal sectional view, taken in the direction of arrows II—II in FIG. 1;

FIG. 3 is a cross-sectional view, taken in the direction of arrows III—III in FIG. 2;

FIG. 4 is an exploded view of the retention means;

FIG. 5 is a view similar to FIG. 3, but enlarged to illustrate better the retention means; and FIG. 6 is a cross-sectional view of the assembled retention means before it is inserted into the tip and shank.

DETAILED DESCRIPTION OF THE DRAWINGS

FIG. 1 illustrates a work tool 10 for a construction vehicle comprising a shank or support member 11 having a hardened impact or ripper tip 12 mounted on a V-shaped nose 13 thereof. The nose 13 has outer surface portions 14 which are continuously maintained in bearing contact with the tip by a retention means 15 of this invention which detachably mounts the tip on the support member. It should be understood that although such retention means 15 is particularly adapted for impact and ripper tip applications, that it is equally adaptable for use with tips employed on loader buckets, scraper blades and other types of related work tools employed for constructions operations.

As more clearly shown in FIGS. 2, 3 and 5, an elliptical bore or first opening 16 is formed by a wall 16' through the support member 11 and is in general alignment with like-shaped second openings 17 and 18, formed through side walls or plates 19 and 20 of the tip, respectively, by walls 17' and 18'. The side plates 19 and 20 straddle the support member 11 and openings 17 and 18 thereof are larger than opening 16 to facilitate the hereinafter described assembly of the work tool.

Retention means 15 is disposed on a longitudinal axis X thereof and comprises a retainer 21 of U-shaped cross-section defining a cavity 22 therein, as more clearly shown in FIGS. 3, 4 and 5. A lock pin means 23 is partially disposed within the cavity 22 and includes an elongated bar 23' and a pair of protuberances 24 and 25 formed on opposite ends thereof in straddling relationship relative to the support member 11. An elastomeric means 26, such as a compressible rubber or plastic slug having the desired hardness and related physical properties, is disposed in cavity 22 between the retainer 21 and lock pin means 23.

With reference to FIGS. 3, 4 and 5, the retainer 21, which is made of a resilient expandable material, preferably a metal, suitable for the purposes to be described, comprises a bottom wall 27 and a pair of upstanding and parallel side walls 28 and 29 which define cavity 22. A pair of upstanding end walls 30 and 31 are secured to the bottom wall 27 and side walls 28 and 29 of the retainer 21 to further define cavity 22 therein. Flanges 32 and 33 are integrally formed on the upper edges of side walls 28 and 29, respectively, to extend the full longitudinal length of the retainer 21.

FIG. 6 illustrates the retention means 15 prior to assembly of the work tool 10, in which the retainer 21 is in its unexpanded state and the elastomeric slug 26 is decompressed. In this state, the lower area 23" of pin means 23 is in contact with the internal sides 32', 33' of walls 28, 29 and and with the upper surface of elastomeric slug 26. For reasons which will be described below, flanges 32 and 33 extend from side walls 28 and 29 such that they will contact the wall 16' in this unexpanded state of the retainer 21. That is, the width d from side-to-side of flanges 32 and 33, as shown in FIG. 6, is substantially equal to the width d of opening 16, as shown in FIG. 5.

The retention means 15 is shown in an expanded state in FIG. 5 for securing the tip 12 to the support member 11. In this state, pin means 23 will exert a downward force, as viewed in FIG. 5, to compress elastomeric slug 26. Consequently, slug 26 will exert a pressure to expand sidwalls 28 and 29 and bottom wall 27 into the void area of opening 16 for bearing contact with internal wall 16' to secure more strongly the tip 12 and support member 11. However, since the width d of flanges 32 and 33 is substantially equal to the width d of opening 16, this slug pressure will not cause expansion of these flanges so that the lower area 23" of pin means 23 will remain in contact with the internal sides 32',33' of the walls 28, 29. If the flanges 32 and 33 were allowed to expand, i.e., if their width d were less than the width d of opening 16, then the elastomeric slug 26 would extrude out between the internal sides 32',33' and area 23" so that no expanding force would be exerted on the sidewalls 28 and 29. This same force which plastically deforms the sidewalls 28 and 29 is exerted between the tip 12 and shank 11 to seat firmly the tip on the shank, and also to maintain a constant force between the tip and shank. It therefore also will be appreciated from comparing FIGS. 5 and 6 that the side walls 28, 29 are free of contact with the internal wall 16' in the unexpanded state of retention means 15, while the bottom wall 27 is partially free of contact with the internal wall 16' in the unexpanded state of retention means 15.

The sidewalls 28 and 29, and bottom wall 27, will expand within the plastic range of the retainer 21 so that the retainer will not take a permanent set. Thus, when the work tool 10 is disassembled, the retainer 21 will return to its original shape, as shown in FIG. 6.

To assemble the work tool 10, tip 12 is initially mounted on nose 13 of support member or shank 11 to dispose openings 16–18 in axial alignment. Lock pin means 23 of retention means 15, prior to insertion thereof through the openings, is compressed against the biasing force of elastomeric slug 26 to dispose protuberances 24 and 25 thereof at a retracted position allowing insertion of the retention means 15 through opening 16. Upon release of the lock pin means 23, the retention means 15 will expand to place protuberances 24 and 25 in their FIG. 2 straddling position on either side of the support member 11. The protuberances 24 and 25 will engage side plates 19 and 20 via walls 17' and 18' in bearing contact therewith, whereas bottom wall 27 and side walls 28 and 29 of the retainer 21 will engage surface portions of wall 16' of the support member 11, also in bearing contact therewith, as already described. Thus, the elastomeric slug 26 will function to retract the tip 12 onto the support member 11 to maintain continuously a minimum predetermined prelaod or bearing contact, such as 12,000 lbs., between nose 13 of the support member 11 and the tip 12. The retention means 15, therefore, is easy to insert into or remove from the openings 16, 17 and 18, yet once in these openings very firmly secures members 11 and 12 together.

Also, universal retention functions are provided by retention means 15 whereby protuberances 24 and 25 prevent it from moving in the direction of longitudinal axis X (FIG. 2), elastomeric slug 26 imposes the above-described biasing forces on the retention means 15 to retract and urge the tip 12 in the direction of arrow Y, illustrated in FIG. 1, to maintain the desired bearing contact between the tip 12 and the support member 11, and flanges 32 and 33, which contact internal walls 16',17' and 18', prevent relative movement of the tip and the support member in the direction of arrow Z, also shown in FIG. 1.

While the invention has been particularly shown and described with reference to preferred embodiments thereof, it will be understood by those skilled in the art that the foregoing and other changes in form and details may be made therein without departing from the spirit and scope of the invention.

The embodiments of the invention in which an exclusive property or privilege is claimed are defined as follows:

1. Apparatus for securing together one member having a first wall defining a first central bore to another member having second walls defining second bores aligned on either end of said central bore, comprising:
    (a) a resilient expandible retainer of U-shape having a bottom wall, first and second side walls, and first and second end walls defining a cavity therebetween, said retainer further having first and second flanges extending from upper portions of said first and second side walls, said bottom wall being constructed to contact one of the first wall and the second walls, said first and second flanges being constructed to contact the one of the first wall and the second walls in the unexpanded state of said retainer, said side walls being constructed to be free and said bottom wall being constructed to be partially free of contact with the one of the first wall and the second walls in the unexpanded state of said retainer, said retainer having a resiliency to enable expansion of said side walls and said bottom wall to secure together the one member and the other member;
    (b) a lock pin being constructed to be partially disposed in said cavity in close fit with said first and second side walls and said first and second end walls and to contact the other of the first wall and the second walls; and
    (c) elastomeric means for expanding said first and second side walls and said bottom wall, said elastomeric means being positionable in said cavity between said lock pin and said bottom wall, whereby when said lock pin contacts the other of the first wall and the second walls, said elastomeric means expands said first and second side walls and said bottom wall into contact with the one of the first wall and the second walls.

2. Apparatus according to claim 1 wherein said retainer is elongated, said end walls being constructed for positioning in the second bores.

3. Apparatus according to claim 1 wherein said lock pin includes an elongated bar having first and second ends and protrusions extending from said first and second ends of said bar.

4. Apparatus according to claim 1 wherein said elastomeric means comprises compressible material completely filling said cavity in the unexpanded state of said retainer.

5. Apparatus according to claim 1 wherein said elastomeric means is rubber.

6. Apparatus according to claim 1 wherein said elastomeric means is plastic.

7. Apparatus according to claim 1 wherein said first and said second flanges are elongated to contact both the first wall and the second walls to prevent relative movement between the one member and the other member.

8. A work tool for a construction vehicle comprising:
   (a) a support member having a first wall defining a first opening through said support member;
   (b) a tip having a pair of laterally spaced side plates straddling said support member and having second walls each defining a second opening through each of said side plates, said second opening being at least generally disposed in axial alignment with said first opening; and
   (c) retaining means for retaining said tip on said support member, said retention means being disposed in said first and second openings and including:
      (i) a resilient expandible retainer defining a cavity therein and having a bottom wall in contact with one of said first wall and said second walls of said support member and said tip, first and second expanded side walls extending from said bottom wall and said second walls, first and second end walls, and first and second unexpanded flanges extending from upper portions of said first and said second side walls in contact with said one of said first wall and said second walls;
      (ii) a lock pin partially disposed within said cavity in close contact with said first and second side walls and end walls and contacting the other of said first wall and second walls; and
      (iii) an elastomeric member disposed in said cavity against said side walls and end walls and said bottom wall between said retainer and said lock pin, said member urging said retainer into bearing contact with one of said support member and said tip and urging said lock pin into bearing contact with the other of said support member and said tip.

9. A work tool according to claim 8 wherein said support member includes a shank and said tip includes a hardened ripper tip.

10. A work tool according to claim 8 wherein said lock pin includes a bar having a pair of protrusions contacting the other of said first wall and said second walls.

11. A work tool according to claim 10 wherein each said second opening is larger than said first opening, said protrusions being constructed to prevent said retention means from moving in a longitudinal direction thereof out of said first and said second openings.

* * * * *